Jan. 20, 1970     N. F. GUICHET     3,490,146
PANTOGRAPH
Filed Nov. 9, 1967     2 Sheets-Sheet 1
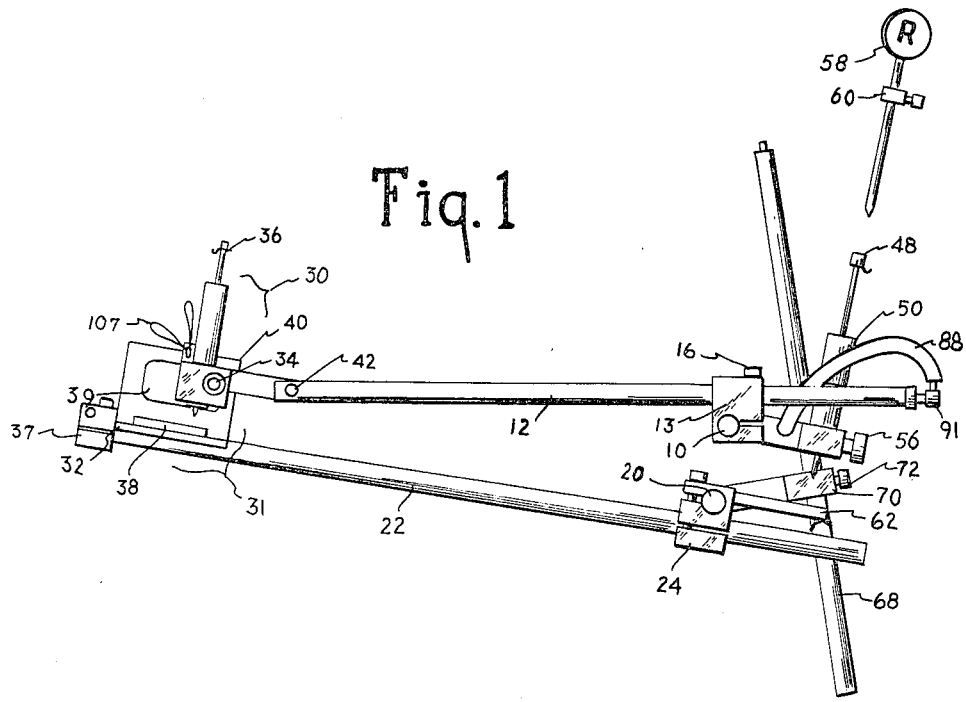
Fig. 1
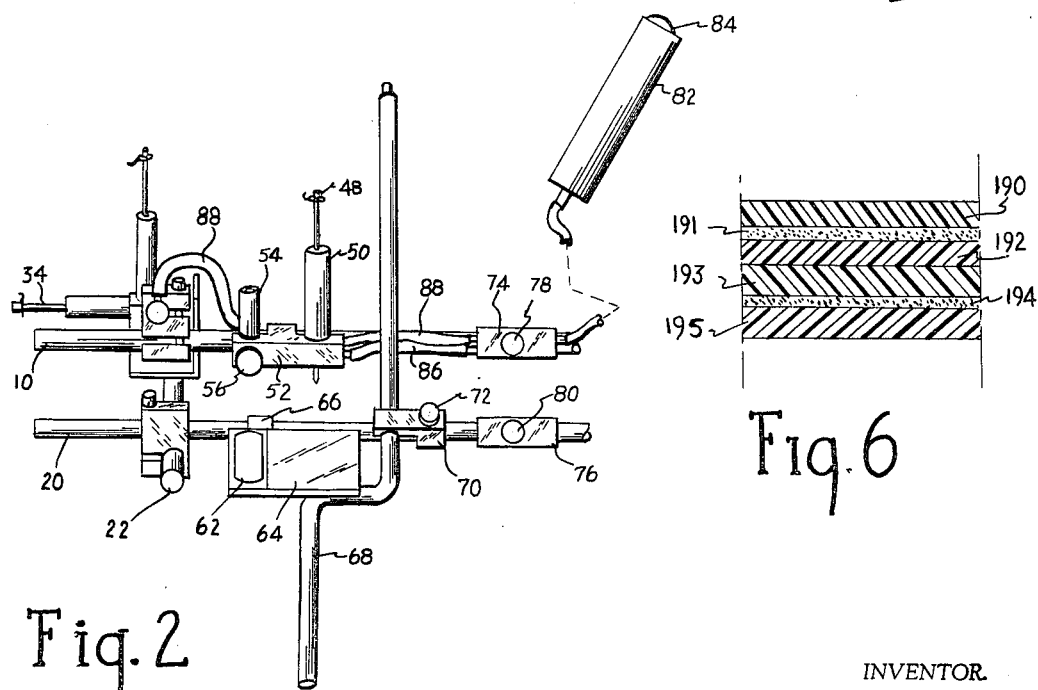
Fig. 2
Fig. 6
INVENTOR.
Niles F. Guichet
BY
Attorney Jan. 20, 1970 N. F. GUICHET 3,490,146
PANTOGRAPH Filed Nov. 9, 1967 2 Sheets-Sheet 2

INVENTOR.
Niles F. Guichet
BY
*Robert E Shauers*
ATTORNEY

United States Patent Office 3,490,146
Patented Jan. 20, 1970

3,490,146
PANTOGRAPH
Niles F. Guichet, 320 Olympia Place,
Anaheim, Calif. 92806
Continuation-in-part of application Ser. No. 348,013,
Feb. 28, 1964. This application Nov. 9, 1967, Ser.
No. 681,785
Int. Cl. A61c *19/04;* A61b *5/10*
U.S. Cl. 32—20                                    4 Claims

ABSTRACT OF THE DISCLOSURE

The invention comprises an improved pantograph for obtaining precise tracings of the mandible utilizing posterior horizontal scribers having removable orientation means for positioning the scribers at the hinge axis of the mandible. The pantograph includes as an optional feature recording styli remotely controlled with fluid pressure and pressure sensitive tracing pads. The invention also comprises pressure sensitive recording papers comprising in successive layers, a backing paper carrier, a releasable adhesive, a pressure sensitive coating and a clear protective overlay on a second carrier with a releasable adhesive. This recording paper is suitable for use in any recording device and is particularly suitable for use with the pantograph of this invention.

---

This application is a continuation-in-part of my copending application, Ser. No. 348,013, filed Feb. 28, 1964 and now Patent No. 3,431,649 issued Mar. 11, 1969.

This invention relates to improvements in pantographs and to improvements in pressure-sensitive paper which can be used in combination with the pantographs for obtaining tracings of the mandible.

Pantographs have been employed for obtaining tracings of the paths of movement of the human mandible and these devices generally comprise a first face bow which is secured to the maxilla and a second face bow which is secured to the mandible. Scribers are carried by one of these face bows positioned opposite to recording tables on the other face bow. The face bows are commonly mounted on the maxilla and the mandible by dental clutches. The tracings obtained with the pantograph are mounted on a dental articulator and are used to set the articulator to follow the tracings and duplicate the mandible excursions.

The face bows commonly support the tracing means, i.e., styli and recording tables externally of the human jaw. Since the lateral excursions of the mandible are translational and/or rotational about one or the other of the condyles of the mandible and since the recording tables are mounted away from the exact center of these movements, the excursions are recorded by the scribers as lines or arcs moving with or about the rotational centers. Failure to locate the posterior scribers at the axis of rotation passing through the right and left condyles additionally complicates the tracings and the greater the discrepancy between the position of the posterior scribers and the horizontal axis of rotation of the condyle, the less precise is the tracing and the greater is the distortion of the tracings from the actual paths of the mandible excursions.

It is generally desirable to position the rear tracing styli on the lower face bow so that the tracings are direct recordings of the mandible movements. Heretofore, the hinge axis centering pins have been positioned on the face bow arms which support the posterior tracing pads. Since the centering pins are used to support the face bow on the articulator, this has required the temporary cementing of the upper and lower face bows in the centric position when mounting the casts in the articulator. Other methods of mounting have used mounting stands in an intermediate transfer procedure.

The pantographs have also heretofore been employed with a recording table on which is dispersed a coating of talc in a volatile solvent such as an alcohol. The solvent evaporates and leaves a talc coating on the table which is scratched by the recording scriber for obtaining the record of the mandible movement. To protect the tracings, an adhesive transparent tape is placed on the talc coating and then pulled off carrying with it most of the talc coating from the table after the articulator has been set to the proper movements.

It is an object of this invention to provide a dental pantograph which provides for precise tracing of the mandible movements.

It is also an object of this invention to provide a dental pantograph which permits mounting of the upper model in the articulator without the necessity of cementing the upper and lower face bows together.

It is also an object of this invention to provide a pantograph that permits the direct transfer of the pantograph to an articulator without the necessity of employing a mouning stand.

It is likewise an object of this invention to provide means permitting the posterior horizontal styli to be positioned precisely on the hinge axis.

It is also an object of this invention to provide a pantograph having interchangeable upper and lower side arms so that the device is flexible to obtain either direct tracings of the mandible or can be assembled with all the styli and all the recording tables on their separate face bows.

It is an object of this invention to provide a dental pantograph in combination with sensitive chart paper that is laminated with adhesive and protective coatings for facile use and preservation.

Other and related objects will be apparent from the following description of the invention.

The invention will now be described by reference to the figures of which:

FIGURES 1 and 2 illustrate the pantograph assembly of my invention;

FIGURE 6 illustrates the laminated pressure sensitive recording papers used with the pantograph of my invention.

Figure 3:
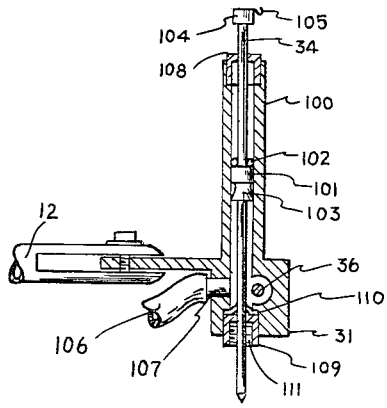
FIGURE 3 illustrates a cross-section of a remotely controlled stylus employed in the pantograph.

Referring now to FIGURE 1, there is illustrated the pantograph assembly. This assembly comprises an upper and lower face bow. The upper face bow comprises a first crossbar 10 to which are affixed sidearms such as 12 by lock clamps such as 13. These lock clamps have transverse bores which are slotted as shown and which have a compression screw such as 16 that can be tightened to compress the slots and bind the clamp against the crossbar and sidearm. Affixed to the lower crossbar 20 are similar sidearms 22. The posterior of the sidearms support the recording tables and the tracing styli. The sidearms are interchangeable so that either face bow can support the recording styli. As shown, the upper face bow supports the styli assembly 30 and the opposite face bow supports the recording table assembly 32. The styli assembly has a horizontal recording stylus 34 and a vertical recording stylus 36. These are adapted for pneumatic actuation to permit remote control of the recording function. Also as described herein in greater detail, the recording tables carry removably mounted pressure sensitive paper 38 and 39 which are mounted opposite the recording styli and which are sensitive to the pressure exerted by the styli when actuated with the pneumatic pressure.

FIGURE 1 shows the posterior styli supported on the upper face bow. The alternative arrangement, i.e., the posterior styli on the lower face bow is preferred for ease of mounting the dental casts as described in reference to FIGURES 3–5. In FIGURES 1, the hinge axis centering pins are mounted to the rear of 39 by block clamps 37. When the lower face bow carries the styli assembly, the hinge axis centering pin is removably attached to this assembly as shown in FIGURE 4.

The anterior of the pantograph has recording means for anterior tracings. These are illustrated in the view presented in FIGURE 2, which shows the right side of the assembly. The recording stylus 48 is carried by the upper face bow opposite recording table 64 of the lower face bow. The assemblies are preferably combined with check bite reference means comprising at each side, a check bite pin holder 54 which supports a pin such as 58. The pin holder 54 is mounted opposite a check bite tray 62 on the opposite face bow. The check bite support and the recording stylus assembly are combined in a single unit comprising T-shaped clamp 52 that is secured to crossbar 10 with a compression screw that passes through transversely to a slot in the rear face of 52 and that intersects the bore through 52 surrounding bar 10. The check bite holder comprises cylinder 54 and set screw 56 which extends into the cylinder to bind the check bite pin 58 in the holder.

The check bite pin has an identifying flag as shown to indicate that the pin is used for the right centric position. A clamp 60 with a set screw is provided on this pin and rests upon the top of cylinder 54 to record the depth of the pin within this cylinder when the centric position is recorded on the patient. The lower end of the pin indents the wax or plastic on the impression tray 62 in this position.

Adjacent the recording table and wax impression tray assembly is the clamp for the reference plane support rod 68 used to orient the lower face bow to the proper vertical position with reference to a horizontal reference plane that passes through the axis of the condyles. This support rod 68 is suitably and movably mounted with a block clamp 70 having a compression screw 72 for locking the vertical position of the rod to the clamp with a compression screw 74 to lock the block clamp 70 to the lower crossbar 20.

The upper and lower crossbars carry, at their approximate centers, blocks 74 and 76 that are permanently secured to the crossbars and that bear, on their posterior surfaces, a lateral track that runs parallel to the crossbar for indexing thereto clutches formed in accordance with my invention described in copending application Ser. No. 625,213. Screws 78 and 80 extend posteriorly through these blocks and into the track to engage a threaded boss on the clutch thereby temporarily and rigidly securing and indexing the clutches to their respective face bows in a fixed and predetermined orientation. The nature of the clutches and the manner in which they are keyed to the face bows is described in greater detail in the aforesaid copending application.

A preferred embodiment of the pantograph comprises remotely controlled styli which are actuated by fluid pressure, preferably pneumatic. This pressure is supplied from a suitable source and is controlled by hand valve 82 having a finger-actuated plunger 84. Flexible tubing communicating with a source of fluid pressure, e.g., compressed air, connects to the valve 82 and a manifold in block 74. Tubing branch lines 88 and 86 extend to the recording styli. Tubing 88 passes through block 52 and terminates with a male fitting 91 that seats in a plastic insert 90 on the end of upper side arm 12. A tubing extends through this arm and connects to the posterior tracing assembly 30.

Figure 4:
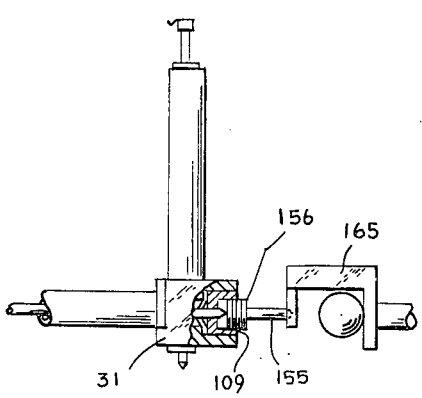
FIGURE 4 illustrates the combination of the mounting axis and lower face bow of the pantograph.

Referring now to FIGURE 3, the posterior styli assembly is shown in cross-section. The assembly comprises a posterior horizontal stylus 34 and a vertical stylus 36. These are supported in block 31 by cylinders such as 100 shown in cross-section. The cylinders can be separate sleeves that are compression fitted into bores in block 31 or the entire block and cylinder assembly can be a single casting. The styli have a centrally positioned lug such as 101 which is surmounted by an O-ring 102 and a bell-shaped or flared rubber piston 103, the lower periphery of which engages the inside of the cylinder wall. The top of the stylus has a shoulder 104 with hook 105 attached thereto. The stylus as illustrated is adapted for spring biasing into the recording position and flexible rubber bands 107 (see FIGURE 1) are provided for fastening to the hook 105. The styli are forced out of the recording position by pneumatic pressure from tubing 106 which communicates with 88. The stylus cylinders 100 are capped at opposite ends with caps 108 and 109. Above cap 109 is a seal 110 having a bevelled inner surface as shown for sealing the pneumatic cylinder between this washer and the rubber skirt 103 which seals the area beneath piston 103. The under side of 109 has a large diameter bore 110 which is tapped for removable mounting of the hinge axis centering pin.

Referring now to FIGURE 4, the hinge axis centering pin 155 and its removable mounting on the horizontal recording stylus is shown. The pin 155 is shown with its pointed end engaging an indexed recess on a condyle guide assembly 156 as occurs when the lower face bow is mounted on an arcon type articulator. Alternatively, the pin can engage a recess cut directly into the surface of the condyle. Pin 155 has a threaded shank 156 which can be turned into a threaded bore 110 on the underside of the posterior scriber cap 109. The threaded bore is placed on the centerline of the recording stylus and is in cap 109 which fits into the block 31 so that the pin 155 is located precisely over the stylus which is shown in a retracted position in FIGURE 4 so that the pin 155 can be inserted.

Figure 4A:
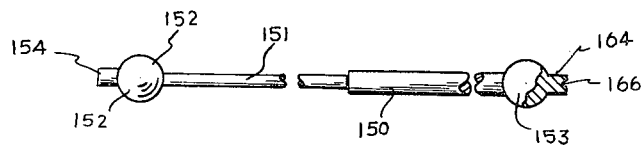

The mounting assembly with the hinge axis centering pins 155 can also be used on the articulators with journalled condyle guides. FIGURE 4a shows this mounting with condyle guide 175 which is journalled in a supporting structure shown also in FIGURE 5. With this articulator a mounting axis comprising telescoping shafts 151 and 150 is used. These bear, at opposite ends condyles 152 and 153 which are slid into the condyle tracks of the guides such as 175. At the outboard end of the condyles are bosses 154 and 164 which have an indentation for receiving the end of pin 155.

Figure 5:
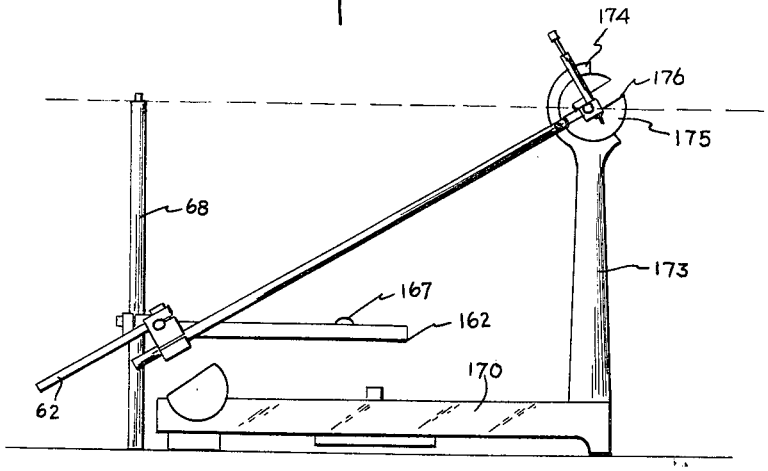
FIGURE 5 illustrates the placement of the lower face bow on an articulator.

Referring now to FIGURE 5, the lower face bow is shown mounted in a dental articulator which is shown without the upper articulator member. The articulator lower member has a base 170 and at its posterior end, two upright columns 173 that support circular journals 174 in which are mounted the condyle guides 175 that have condyle slots 176. The spherical condyles 153 and 152 of the mounting axis of FIGURE 4a are supported within the slotted tracks of these condyle guides 176. The posterior of the face bow is supported with the pin engaging the outboard bosses 154 and 164. The anterior of the face bow is supported by an anterior reference plane support rod 68. This rod is set to the proper vertical height so that its upper end lies in a horizontal reference plane passing through the condyle center. This plane is indicated by the dashed line.

With the centering pins of this invention, the lower face bow can be oriented to the hinge axis of the articulator and the anterior of the face bow can be set in its proper vertical position with an anterior reference plane support rod. The upper face bow can then be rested on the lower face bow using check bite pins indexed in the plastic or wax on the tray such as 62 on the lower face bow. The upper model can then be cemented to the upper frame member which is substituted for the mounting axis.

Referring now to FIGURE 6, there is illustrated a cross-section of the removable pressure sensitive recording papers used with my pantograph. These papers have a pressure sensitive coating and have adhesive for mounting to the tables. The components of this laminated paper comprise a clear protective overlay 190 which can be of a clear vinyl, e.g., vinyl acetate having from about 1 to 15 mils; preferably about 3 mils thickness. The overlay has an adhesive firmly secured to its undersurface as shown at 191 so that it can be applied to the recording paper after the latter has been applied to the table and the recording obtained. The upper surface of the paper thus exposed is shown as 192 and comprises a scratch coating, e.g., a wax layer from about 1 to about 10 mils thickness; preferably about 3 mils. This coating can be scribed by the styli with light pressure of about 0.05 to 0.5 ounce to leave a tracing on the surface of the paper.

The paper comprises a backing 193 which can be a paper such as a 25 pound stock having a thickness from about 1 to about 10 mils thickness. The undersurface of the backing has a releasable adhesive, hereinafter described, firmly secured to its undersurface.

The releasable adhesive secures the transfer paper to the recording tables and is protected by a thin protective layer 195 which can be a thin sheet of waxed or other protective paper. The combination of the pressure sensitive recording paper and the transparent desensitizing protective overlay 190 provide a highly useful recording means in combination with the remotely controlled styli of the pantograph of my invention. The recording blanks are fabricated from the paper stock that has been coated with coating 192, 194 and protected with layer 195. In the fabrication of the blanks 30 and 38, a metal die is used to cut the blanks from the aforementioned paper stock and similarly cut overlays 190 are also provided.

The adhesive coatings 191 and 194 are the pressure sensitive type adhesives well known in the art. These actually are formed generally with at least two coatings on the backing paper or fabric. The first coating is a primer or anchor coating to obtain maximum adhesion between the adhesive coating and the backing. Primer coatings which are useful include blends of natural rubber latex with casein, polyvinylalcohol, hydrophilic colloid latex, terpolymers of butadiene, styrene and acrylonitrile, mixtures of casein and polyvinyl pyrrolidone in latex rubber, etc.

The adhesive is a permanently tacky coating. Suitable adhesives are formed with a natural or synthetic, e.g., butadiene-styrene, rubber matrix into which is incorporated a tackifying resin. Wood rosin, esters thereof, coumaroneindene resins, polyterpene resins, pinene phenolic condensates and phenolic resins can be used as tackifying resins. Pigments can be optically added to increase adhesion and the coating can also be vulcanized to increase its solvent resistance.

The following illustrate tackifying resin compositions which can be incorporated in a latex matrix in an amount from about 5 to 35 weight percent to obtain the adhesive coating:

| | Parts |
|---|---|
| (1) Hydrogenated methyl abietate | 50 |
| Rosin | 50 |
| (2) Hydrogenated ethyl abietate | 40 |
| Coumarone-indene resin | 60 |
| (3) Hydrogenated benzyl abietate | 70 |
| Rosin | 30 |

The releasable adhesive secures the transfer paper to the recording tables and is protected by a thin protective layer 195 which can be a thin sheet of waxed or other protective paper. The combination of the pressure sensitive recording paper and the transparent desensitizing protective overlay 190 provide a highly useful recording means in combination with the remotely controlled styli of the pantograph of my invention.

The recording blanks comprising layers 192, 193 and 194 are applied to the tables and the patient is instructed to move his mandible. The styli are urged into a recording position against the pressure sensitive paper by proper control of the valve 82. After recording, overlays 190 are placed over the papers to protect them against erasure or accidental scratching. After the recordings have been used to set the articulator, the entire assembly of recording paper and protective overlay is removed by parting the bond between the releasable adhesive and the table and the recordings can be preserved for further reference.

The operation of the pantograph is fairly obvious from the preceding description. The pantograph is positioned on the patient's face by placing the lower clutch and lower face bow assembly on the patient's mandible and using the hinge axis pins 155 which are threaded into the threaded bores on the inside surface of the horizontal recording styli cap as described with reference to FIGURE 4. These pins are oriented to the reference points on the patient's face which have previously been located on the hinge axis with a hinge axis locator. The hinge axis centering pins 155 are then removed and the upper face bow is placed on the patient's maxilla. Since the anterior of the sidearms of the upper face bow preferably support the recording table, these tables with the pressure sensitive papers applied thereto are inserted between the posterior recording styli and the side of the patient's face. These posterior recording tables are adjusted into the proper spacial relationship and secured by tightening the screws of the clamps on the upper crossbar.

The reference plane support rod clamp 70 is adjusted parallel to the reference plane scribed on the patient's face and the anterior recording tables such as 64 are adjusted parallel to the side arms of the face bow. The anterior scriber support clamps are adjusted so the centric checkbite cylinders such as 54 are vertically positioned above the wax wells 62. The pneumatic connectors 91 are seated into the plastic caps 90 and the stylus control valve is connected to the air syringe and to the pantograph manifold in block 74. The air pressure supplied to the styli force the styli away from the recording papers and the elastic bands 106 and 107 are secured to their hooks such as 105 to urge the styli into a recording position. The patient is then instructed in the movements and when thoroughly familiar with the pantograph, button 84 is depressed, releasing the air pressure and permitting the elastic bands to move the styli into a recording engagement with the sensitive papers.

After the recording, the anterior reference plane support rod is oriented on the pantograph. A plane locator which is a flat L-shaped sheet of thin plastic or metal is placed on the top of the rod and the rod is moved in its clamp until the plane locator is oriented in a horizontal plane passing through the hinge axis. The clamp 70 is then used to lock the rod in this position. The pantograph is then removed from the patient and the tracings on the papers are protected by covering with the clear plastic overlays 190.

The invention has been described in reference to a particular illustrated embodiment of the pantograph. It is not intended that the invention be unduly limited by this illustration which shows the preferred mode of practice of the invention, but instead it is intended that the invention be defined by the elements and their obvious equivalents set forth in the following claims:

I claim:

1. A dental face bow for recording mandible tracings and for the direct mounting of dental casts in precise spacial position in a dental articulator that comprises: a cross bar, means to removably mount said cross bar to a patient's mandible or maxilla carried on said cross bar, right and left side arms with one of their ends adjustably mounted opposite ends of said cross bar, right and left posterior vertical and horizontal recording styli movable between recording and retracted positions carried at the other ends of said side arms, and hinge axis centering means adjustable to project inwardly past the fully extended recording position of said horizontal recording styli to thereby permit direct orientation of said horizontal recording styli to the hinge axis of the mandible.

2. The dental face bow of claim 1 wherein said centering means are removably mounted on said face bow.

3. The dental face bow of claim 1 wherein said centering means comprises a pin which has a threaded shank that engages a threaded tap on the inside surface of a posterior styli support block.

4. A pantograph comprising upper and lower face bows, each comprising a cross bar with right and left side arms adjustably mounted at opposite ends of the cross bar by clamping means; clutch means carried by each cross bar and adapted to be mounted on the teeth of upper and lower face bows in operative recording associations; the first set of right and left side arms bearing at their posterior ends vertical and horizontal posterior recording tables; the second pair of said right and left side arms bearing at their posterior ends, vertical and horizontal recording styli opposite and in recording juxtaposition with said recording tables; and said first and second pair of side arms being interchangeable in said clamping means for mounting on either of said cross bars.

References Cited

UNITED STATES PATENTS 3,078,584  2/1963  Cohn.
3,130,494  4/1964  MacKay _____ 32—20

ROBERT PESHOCK, Primary Examiner

U.S. Cl. X.R.

33—174